July 26, 1966  A. E. GEMMA  3,262,719
SELF-WELDED FLEXIBLE JOINTS
Filed Oct. 19, 1965  2 Sheets-Sheet 1

INVENTOR
ANTHONY E. GEMMA
BY M. B. Tasker
ATTORNEY

INVENTOR
ANTHONY E. GEMMA

United States Patent Office 3,262,719
Patented July 26, 1966

3,262,719
SELF-WELDED FLEXIBLE JOINTS
Anthony E. Gemma, Middletown, Conn., assignor to United Aircraft Corporation, East Hartford, Conn., a corporation of Delaware
Filed Oct. 19, 1965, Ser. No. 505,126
7 Claims. (Cl. 285—41)

This application is a continuation-in-part of application Serial No. 339,997, filed January 24, 1964 and now abandoned.

This invention relates to self-welding swing, or swivel, joints for use in high-temperature liquid conducting pipes and particularly liquid-metal conducting pipes.

In order to remove heat from the core of a nuclear reactor, it is usual to circulate a high-temperature liquid-metal in piping which circulates the liquid-metal through the core and through a heat exchanger remote from the reactor and to other accessories external to the reactor. In the liquid-metal art it is generally felt that mechanical joints are unsatisfactory for liquid-metal piping if the system integrity is to be maintained over an extended period of time, particularly where a degree of thermal cycling is anticipated. For this reason, welded joints are made mandatory in such a system.

In some instances, however, it is advantageous or necessary that segments of the piping be free for rotational adjustment after the system has been assembled. For example, in a space power system utilizing a plurality of heat dissipating radiators, it is necessary to stow the radiator panels in a compact package before and during launching, the panels being subsequently unfolded in space to present the increased area necessary for heat dissipation by radiation.

Accordingly, it is an object of this invention to provide a plurality of self-welding swing, or swivel, joints for use in this piping which greatly facilitates powerplant packaging and installation. These joints, which remain free for rotational adjustment during the installation of the pipe line or after launching of the system, provide the desired freedom of accommodation; yet when the installation or launch is complete and the high-temperature liquid-metal is circulated through the pipe, they self-weld in the predetermined position and form leak-tight joints against internal pressurized high-temperature liquid-metal, such as lithium, sodium, potassium, NaK, or any other high-temperature fluid.

A further object of the invention is to provide such a swing, or swivel, joint which is self-welding independently of any chemical reaction between the joint and the fluid circulated through the joint. The self-welding is effected by means of a solid state diffusion mechanism by which a metallurgical bond is formed between telescoping pipe sections where they radially abut, solid state bonding or welding being recognized in the art as the process of joining metals together at temperatures below the melting points of the metals, usually under pressure.

A still further object is generaly to improve self-welding pipe joints.

These and other objects and advantages of this invention will be evident or will be pointed out in the following description of specific embodiments of the invention shown in the accompanying drawings.

Figure 1:
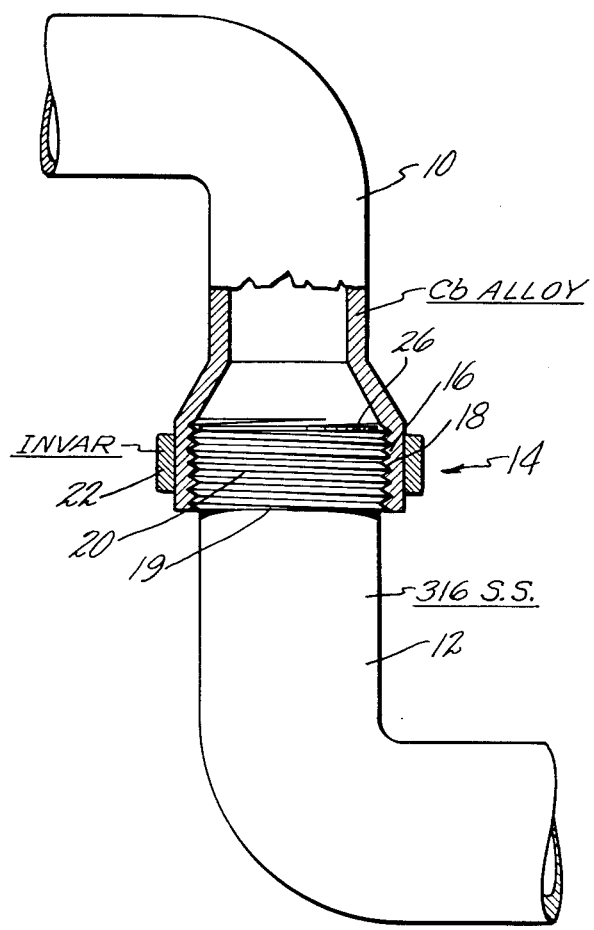
FIG. 1 is an elevation, partly in section, of a swivel pipe joint embodying the present invention.
Figure 2:
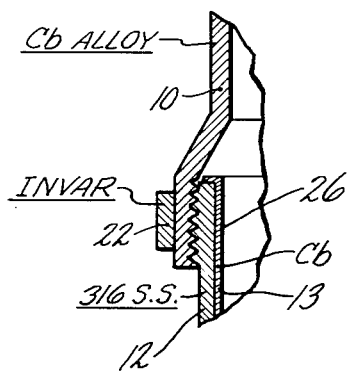
FIG. 2 is a detail sectional view of the joint of FIG. 1.

Referring to FIGS. 1 and 2, two pipe sections 10 and 12 are connected by a swing, or swivel, joint generally indicated at 14. Pipe 10 has an end portion 16 of enlarged diameter which is provided with internal screw threads 18. Pipe 12 also has an end portion 19 of slightly enlarged diameter which is provided with external screw threads 20 adapted to make threaded engagement with threads 18. When the pipe 12 is fully threaded into the threaded socket of pipe 10, or nearly fully threaded thereinto, it will be evident that the two pipes can be rotated relative to each other into different angular positions to facilitate assembly of the adjacent pipe sections. In this form of the pipe joint, pipe section 10 is made of columbium, an alloy of columbium or some other material which has high strength at elevated temperatures and a low coefficient of thermal expansion while pipe section 12 is made of 316 stainless steel or some metal having a high coefficient of thermal expansion as well as high strength at high temperatures. Pipe section 12 is provided with a columbium clad 13 (FIG. 2) so that both pipe sections present a columbium inner surface to the liquid metal. A heavy external band, or collar, 22 of Invar metal, which has a very low coefficient of thermal expansion, is shrunk onto the end of pipe section 10.

When a high-temperature fluid, as a liquid metal, is circulated through the system including pipe sections 10 and 12 and joint 14, the pipe section 12 of stainless steel, due to its high coefficient of thermal expansion, will expand more than pipe section 10 and the collar 22. As a result, the threaded end portion 19 of pipe section 12 will be pressed with tremendous force against threaded portion 16 of pipe section 10, resulting in self-welding of these abutting threaded portions. The pipe sections 10 and 12 will thus be permanently welded against relative rotation and a leak-proof connection will be provided at joint 14.

Figure 3:
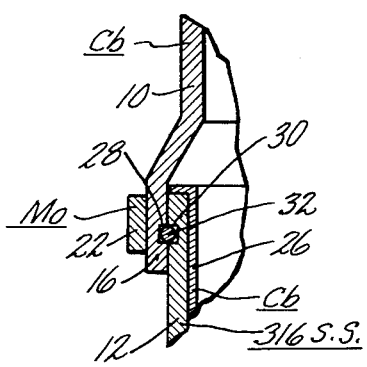
FIG. 3 is a view similar to FIG. 2 showing a modified construction.

In FIG. 3, instead of a threaded engagement between pipe sections 10 and 12 the unthreaded end of pipe section 12 is received in the unthreaded socket of the enlarged end portion 16 of pipe section 10 and complemental confronting grooves 28 and 30 are provided in portion 16 and the end of pipe 12 to receive a 316 stainless steel metal locking ring 32 which prevents accidental axial separation of the pipe sections 10 and 12 while permitting free swivelling movement.

In assembling the locking ring 32, the ring is inserted as a rod through a slant hole (not shown) in enlarged portion 16 of pipe 10 which extends from the external surface thereof into grooves 28 and 30. When the rod has been fully inserted into the grooves of the assembled joint so as to extend completely about the circumference of the grooves, the external end of the rod is cut off flush with the surface of enlarged portion 16 and the slant hole is sealed off by welding the end of the rod to the surface of portion 16. Collar 22, which in FIG. 3 is of molybdenum, is then placed as shown in this figure.

Figure 4:
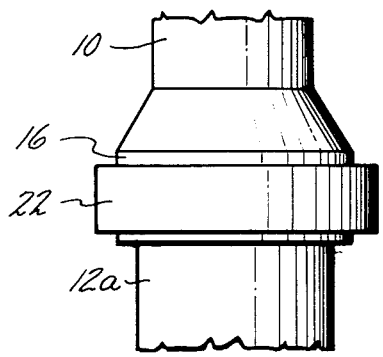
FIG. 4 is a side elevation of another form of joint.
Figure 5:
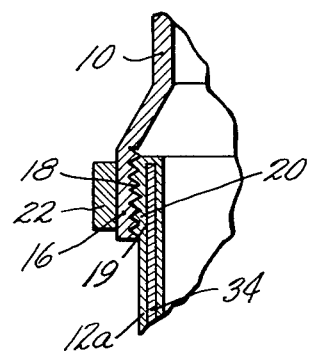
FIGS. 5, 6 and 7 are cross-sectional details illustrating variations in the joint of FIG. 4.
Figure 6:
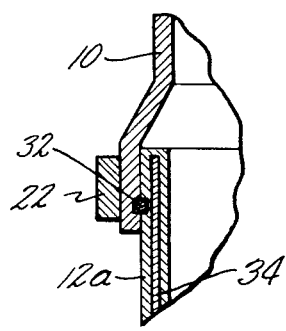
Figure 7:
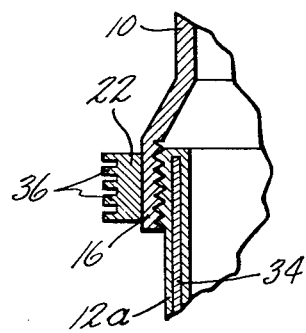

In FIGS. 4–7 still other modifications are shown. FIGS. 4 and 5 are similar to FIG. 2 except that pipe section 12a is of columbium with a stainless steel insert 34. FIG. 6 shows the stainless steel insert 34 in the nonthreaded construction of FIG. 3. In FIG. 7 the Invar collar 22 is additionally provided with cooling fins 36 which help to keep collar 22 at a lower temperature than pipe section 10.

From the above description of several forms suitable for carrying out this invention, it will be evident that means has been provided for permitting free swivelling movement of the joint during assembly and installation of the piping while immediately welding the pipe sections permanently and in leak-tight relationship upon the initial circulation of high-temperature fluid through the system.

Although the instant invention in its more preferred embodiments has been described with reference to particular materials of construction, it will be understood that these embodiments are illustrative only that other materials are contemplated for use therein. The various materials of construction adapted to be joined by solid state diffusion bonding, and the techniques for effecting such bonding, are recognized in the art. Solid state welding techniques have been found applicable to the ferrous metals, copper, nickel, cobalt, aluminum, tin, zinc, titanium, and the refractory metals, including vanadium, tungsten, molybdenum, tantalum, columbium, and other alloys of the foregoing. Further, by cladding or plating one or both of the abutting surfaces of the materials, or by other similar surfaces preparation techniques, solid state bonds may be made between materials not ordinarily susceptible thereto. One such technique is described in the patent to Storchheim 2,837,818. Moreover, even in those instances where the materials are capable of being metallurgically bonded together by these techniques, a bond promoter may be utilized therebetween to facilitate the bonding process. In columbium alloy systems vanadium is frequently used as the bond promoter while in the case of stainless steel systems nickel is often preferred. While in such cases the incorporation of a bond promoter is not necessary, it may be the preferred technique in a given installation.

Those skilled in the art will recognize that one of the more troublesome problems present in a diffusion bonding operation is the presence of contamination on the surfaces to be joined which may adversely affect the bonding process. Accordingly, it is advantageous, and in some cases essential, to remove such contamination and, further, to prevent its reformation prior to or during the bonding process. The particular surface cleaning procedures and surface protection techniques utilized and the necessity therefor will vary, depending upon the materials involved, the equipment available, and the physical environment in which the bond is to be effected. Vapor blasting, degreasing, and pickling steps are usually employed in every fabrication and assembly process of this type and, in many instances, the diffusion heat treatment is performed in inert or reducing atmospheres or in a vacuum to prevent subsequent recontamination. The techniques are standard, however.

It is known that in the formation of a diffusion bond between materials, a time-temperature-pressure relationship is involved, the relationship being dependent upon the physical and chemical characteristics of the metals being utilized. In general, increases in temperature and/or pressure decrease the time necessary to form the desired bond. The more preferred pressures and temperatures for a given system are readily available in the literature.

In particular tests conducted in a stainless steel system, wherein a thin nickel plate was utilized as a bond promoter at the interface between the two materials, a diametrical interference fit of .004–.012″ is a temperature of 1900° F. has been found to provide a complete metallurgical bond between the interfering surfaces in one hour. In a columbium alloy system, utilizing the same interference fit with a vanadium bond promoter, a similar complete metallurgical bond has been formed at 2200° F. However, as previously discussed, a satisfactory solid state weld between these materials may be formed at different temperature and pressure conditions. And in different alloy systems other temperatures and pressures will be found to provide the optimum diffusion bond.

While several forms of the invention have been shown and described, it will be understood that various changes in the construction and arrangement of the parts are possible without exceeding the scope of the invention as defined in the following claims:

I claim:

1. In a self-welding swivel joint for incorporation into a high-temperature fluid conducting pipe line,
    a first pipe section having a terminal socket,
    a second pipe section having one end received within and closely fitting said socket and freely rotatable therewithin into various angular positions relative to said first pipe section, the radially abutting surfaces of said first and second pipe sections consisting of materials capable of being joined by solid state welding, said second pipe section being formed of a material having a high coefficient of thermal expansion,
    means for limiting axial translation between the two pipe sections,
    a rigid collar formed of a material having a low coefficient of thermal expansion relative to that of said second pipe section closely surrounding said terminal socket for restraining the radial expansion of said socket whereby the radially abutting surfaces of the two pipe sections will be forced into contact under pressure due to differential thermal expansion to form a solid state diffusion weld therebetween as the joint is brought to its operating temperature.
    and means for axially positioning said collar on said socket.

2. The self-welding swivel joint of claim 1 in which the first and second pipe sections have engaged threaded portions for limiting axial translation while permitting swivelling movement therebetween.

3. The self-welding swivel joint of claim 1 in which the socket of the first pipe section has an annular groove therein and the end of the second pipe section has a confronting annular groove, and a locking ring is provided in said grooves for lockinga said pipe sections against axial movement while permitting initial swivelling movement therebetween.

4. The self-welding swivel joint of claim 1 in which the first pipe section is formed of columbium alloy, the second pipe section is formed of stainless steel and the rigid collar is formed of Invar metal.

5. The self-welding swivel joint of claim 4 in which the second pipe section is provided with a clad of columbium alloy.

6. The self-welding swivel joint of claim 1 in which the rigid collar is provided with external cooling means.

7. In a self-welding swivel joint for incorporation into a high-temperature fluid-conducting pipe line,
    a first pipe section of columbium alloy having a terminal socket, said socket being threaded internally,
    a second pipe section of stainless steel clad with columbium alloy having one end received within and closely fitting said socket and freely rotatable therewithin into various angular positions relative to stid first pipe section, said second pipe section being threaded externally at one end, the threads engaging those on said first pipe section, the threaded portions of said first and second pipe sections consisting of materials capable of being joined by solid state welding,
    and a rigid collar formed of Invar metal surrounding said terminal socket and in an interference fit therewith, said collar restraining the radial expansion of said socket whereby the threaded portions of the two pipe sections will be forced into contact under pressure due to differential thermal expansion to form a solid state diffusion weld therebetween upon initial passage of a high-temperature fluid through said joint.

(References on following page)

References Cited by the Examiner

UNITED STATES PATENTS

| | | | |
|---|---|---|---|
| 2,137,137 | 11/1938 | Goldpacker | 285—332 |
| 2,341,670 | 2/1944 | Stinson | 285—381 X |
| 2,458,635 | 1/1949 | Pitt et al. | 285—41 |
| 2,691,815 | 10/1954 | Boessenkool et la. | |
| 2,878,040 | 3/1959 | Hobbs | 285—286 |
| 2,998,646 | 9/1961 | Hitz | 29—49 |
| 3,018,547 | 1/1962 | Marskell | 285—382.4 X |
| 3,170,234 | 2/1965 | Tarr | 29—488 |

CARL W. TOMLIN, *Primary Examiner.*

T. A. LISLE, *Assistant Examiner.*